Feb. 3, 1959  T. LOEW  2,871,515
APPARATUS FOR FORMING ARTICLES FROM THERMOPLASTIC MATERIALS
Filed Oct. 26, 1953  2 Sheets-Sheet 1

INVENTOR
THEODORE LOEW
BY
ATTORNEY

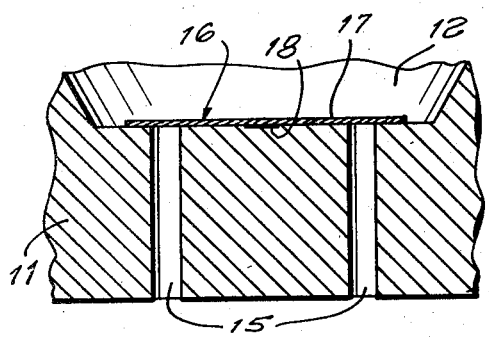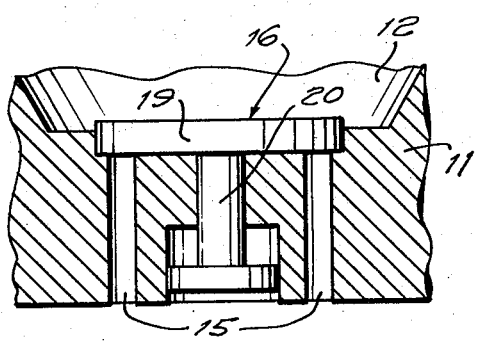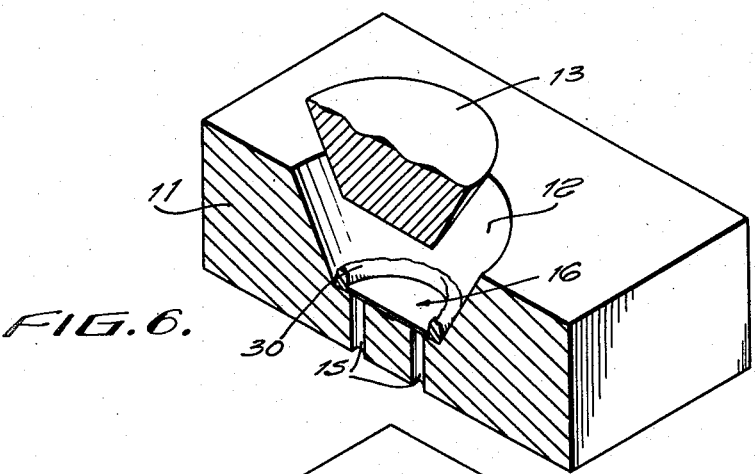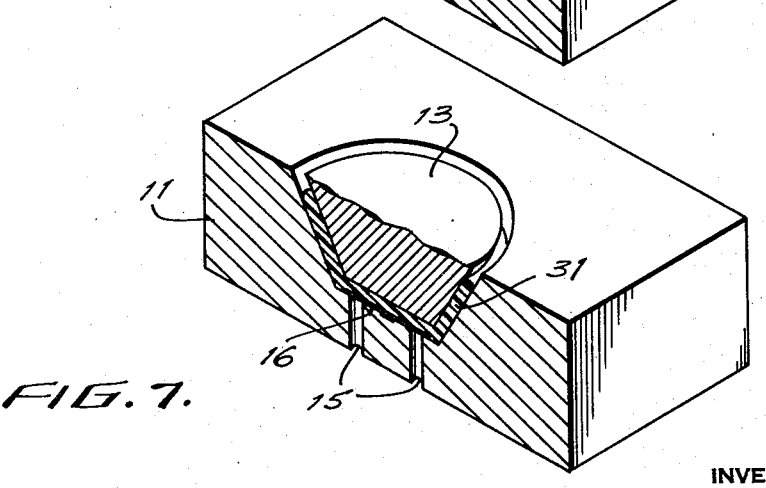

United States Patent Office 2,871,515
Patented Feb. 3, 1959

2,871,515

APPARATUS FOR FORMING ARTICLES FROM THERMOPLASTIC MATERIALS

Theodore Loew, Stamford, Conn., assignor, by mesne assignments, to Kraft Foods Company, Chicago, Ill., a corporation of Delaware Application October 26, 1953, Serial No. 388,213

5 Claims. (Cl. 18—30)

The present invention relates to a new and improved apparatus for forming articles of thermoplastic materials. More particularly the invention comprises the introduction of molten thermoplastic material into a cavity in a partially opened mold followed by the forming of the thermoplastic material into the conformation of the mold cavity by the closing of the mold.

In the past, forming of thermoplastic materials has been done by compression molding and injection molding. In compression molding the thermoplastic material in solid state is placed in a heated mold. The mold is partially closed and the material melted by the heated mold. The mold is then closed to form the article and is subsequently cooled to solidify the thermoplastic to permit removal therefrom. This heating and cooling in the mold requires a slow molding cycle which is sometimes shortened by preheating the plastic below the melting point before placing it in the mold. The cycle is still slow since final melting and cooling takes place in the mold.

In injection molding the plastic is melted in a cylinder, external to the mold, and forced through a small orifice or gate into a cavity in a closed mold. The plastic material is made to conform to the shape of the mold entirely by fluid pressure exerted upon the plastic by the piston in the melting cylinder.

A variation of this technique, called transfer molding, comprises a two section mold. One section is the cavity having the desired final shape of the article, and the other section comprises a heated cylinder in which the plastic is heated and melted. When the plastic is melted, a piston in the heated cylinder is lowered, forcing the plastic through an orifice connecting the two sections. Again the final form is obtained by fluid pressure exerted upon the molten plastic by the piston in the melting cylinder.

In injection and transfer molding the temperature of the mold is usually held below the melting point of the thermoplastic material so that once the cavity is filled the mold may be opened almost immediately, with little or no cooling time, for removal of the molded article. The molding cycle is therefore very much shorter than in compression molding.

In injection or transfer molding extremely high pressures, up to 20,000 p. s. i. or more, are required to force the thermoplastic material through the orifice and into conformity with the shape of the mold cavity. Since the plastic tends to solidify, or freeze, in the cavity, the sections of the cavity must be large enough to permit the flow of extremely viscous, partially solidified, plastic. In handling the usual thermoplastic materials this ordinarily restricts the minimum wall thickness of the article to about one thirty-second of an inch.

The present invention has several advantages over existing methods. It permits a much more rapid cycle than present molding methods. It permits molding of thinner sections than present methods. Since the molding pressures are very much less, lighter and less expensive dies and molding machines are required.

The manner in which these and other advantages are obtained will be apparent from the following description, reference being had to the accompanying drawings, in which:

Fig. 4 is an enlarged sectional view of a mold showing one form of check valve design;

Fig. 5 is a view similar to Fig. 4 showing a modified check valve design;

Fig. 6 is a diagrammatical isometric sectional view through a mold in opened position showing the material flow in the cavity; and Fig. 7 is a similar sectional view showing the mold in closed position and the material conformed to the shape of the cavity.

Figure 1:
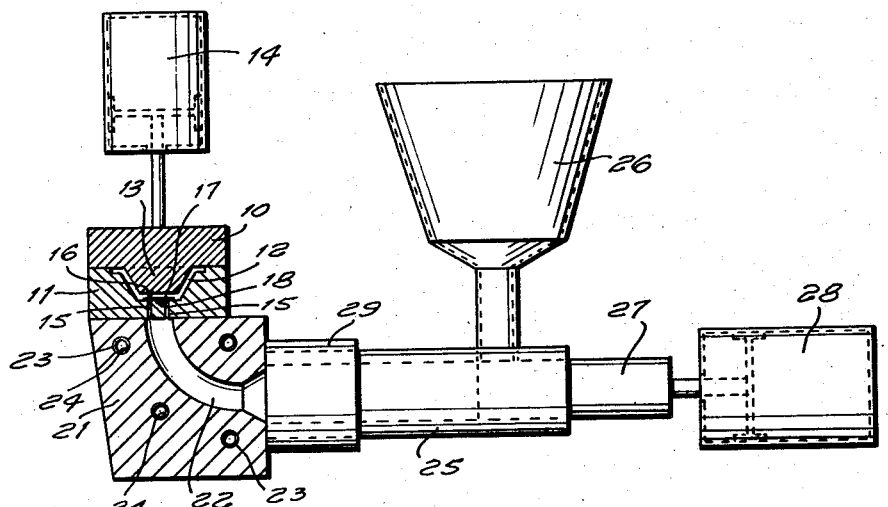
Figure 1 is a diagrammatic representation partly in section of a complete molding unit.

Referring to the drawings, the apparatus comprises an upper or male mold member 10, and a lower or female mold member 11. Generally the cavity 12 that gives the desired external shape to the molded article is formed wholly in the member 11, although in some instances cooperating cavities may be formed in both members that together give the article the desired exterior shape. The mold member 10 has a portion 13 adapted to enter into the cavity and give the article its internal shape or contour.

In the apparatus as illustrated diagrammatically in Fig. 1 the mold member 10 is arranged to move vertically toward and from the fixed mold member 11. However, it is to be understood that either or both of the mold members may be movable. A hydraulic cylinder 14 or other suitable mechanism may be provided to move the member 10 vertically in either direction.

The mold member 11 has a series of openings or passages 15 leading into the cavity 12, preferably disposed in circular arrangement. A check valve 16 normally closes the ends of the passages that lead into the cavity. This valve permits the thermoplastic material to be injected under pressure into the mold cavity but prevents it from returning into the passages.

The check valve may consist of a thin disc 17 made of stainless steel or other suitable material. The disc is spot-welded at 18, at or about its center, to the bottom of the mold member 11 and is of such size as to extend over the ends of the passages 15.

Another form of check valve is shown in Fig. 5. In this instance the valve is a poppet or lift valve 19 having a stem 20. The valve is free to move axially under the action of the fluid pressures sufficiently to open or close the ends of the passages 15 through which the thermoplastic material enters the mold cavity.

The mold member 11 is mounted on a block 21 that contains a passage 22 which leads to the series of passages 15 formed in the bottom of said mold member. The block also has a plurality of holes or openings 23 for reception of heating elements or devices 24 that keep the passage 22 heated to such temperature as to maintain the thermoplastic material in molten condition as it travels from the injection mechanism to the cavity in the mold 11. Other means may be employed to maintain the passage at the required temperature.

The injection mechanism comprises a cylinder 25, a hopper 26 for discharging the thermoplastic molding powder or granules into the cylinder, a piston 27 that works back and forth in the cylinder, a hydraulic cylinder 28 that actuates the piston, and a cylindrical heating element 29 that surrounds the discharge end portion of the cylinder 25 to gradually convert the molding powder or granules into molten condition. The molten material is injected by this mechanism into the mold cavity.

Figure 2:
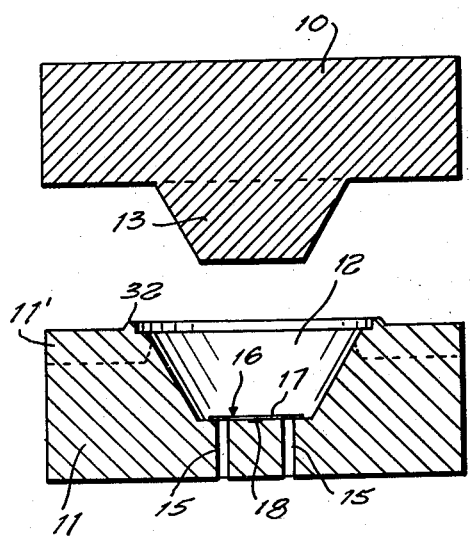
Fig. 2 is a view in cross-section through a mold in opened position to receive a charge of plastic material.
Figure 3:
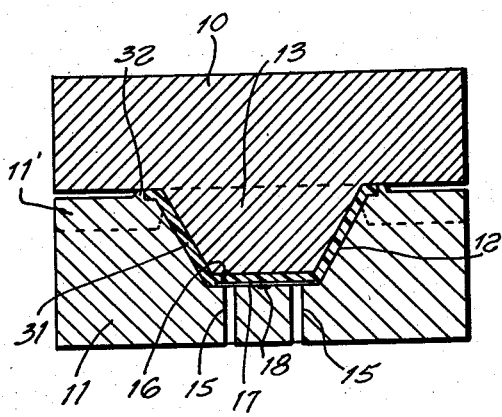
Fig. 3 is a view in cross-section similar to Fig. 2 but with the mold closed and the plastic formed.

Immediately upon injection of the molten plastic into the cavity, the molds are closed as shown in Fig. 3. The force of the portion 13 of the descending mold member 10 impinging on the mass of molten plastic in the mold cavity causes the material to flow and conform to the shape of the space between the inner surface of the cavity 12 and the outer surface of the portion 13 of the male mold member 10. The timing of the motions of the injection piston 27 and the male mold member 10 is such that during the forward movement or thrust of the piston the mold member 10 will be in its raised or open position as shown in Fig. 2.

Upon injection of the molten plastic into the mold it flows into the cavity under the edge of the disc 17 of the check valve to form a gob or a substantially ring-like mass 30 at the bottom of the cavity in mold member 11, as seen in Fig. 6. At that time the portion 13 of the male mold member 10, which portion, as before stated, is designed to enter the cavity of the female mold member 11, is in raised or open position. For the sake of simplicity of illustration the part of mold member 10 above the portion 13 has been cut off and eliminated in Figs. 6 and 7. In the latter figure the two mold members are shown in nearly closed position with the plastic material 31 flowing out to fill the mold cavity. Since the molds are maintained at a temperature below the softening point of the plastic material, the plastic hardens rapidly and the mold may be opened almost immediately for removal of the finished piece and to be ready for a repetition of the molding cycle.

In order to facilitate removal of the molded article or articles and to take full advantage of the rapid cycle of the present molding method, it may be advisable to make the female mold member 11 in two parts, the upper part 11' above the dotted lines in Figs. 2 and 3. In that case the upper part 11' constitutes a collar or ring that supports the molded article, as best seen in Fig. 3, and affords a means of rapid removal of the finished article from the mold. A multiplicity of such collars 11' may be mounted on a turret, conveyor, or other instrumentality that will operate rapidly to bring the collars successively into proper relation and position on the female mold member of a single mold.

As shown in Figs. 2 and 3, an annular ring 32 may be formed on the upper surface of the mold member 11, surrounding the edge of the cavity 12, to cut off any excess material that may be flashed from the mold on descent of the mold member 10. As an alternative, the ring 32 may be formed on the lower surface of the mold member 10 instead of on the upper surface of the member 11.

It will be evident to those skilled in the art that the method of this invention, by taking advantage of the external reserve of molten material, eliminates melting time in the mold. The molten material is injected into the mold under low pressure of about 100 to 200 p. s. i., then the molten material is formed to shape by pressure applied directly to the molten material in the mold.

In the practice of this method, I have been able to make well filled molded articles or objects at remarkably low molding pressures. For instance, I have molded articles of polyethylene at less than 500 p. s. i. and of polystyrene at less than 700 p. s. i. These results arise essentially from two factors. The first is the application of pressure to the material in the mold so that there is no frictional or viscous pressure loss in forcing material through channels, sprues, gates, and the like. The second factor is that the hollow or cavity in the molded article does not reach its final shape until the mold is fully closed, which occurs simultaneously with the final forming or shaping of the article. Reference to Figs. 6 and 7 will clarify this point. The resistance to flow of a liquid through a passage is proportional to the cross-sectional area. Therefore, if the cup-shaped article of Fig. 7 was to be made by conventional injection molding techniques with a wall of 0.010" thickness the material would have to be forced under externally applied pressure throughout the area in a passage only 0.010" thick. Since the mold temperature is normally below the melting point of the plastic the molten material would rapidly freeze and this thin passage or space would become clogged, making filling of the mold impossible. The only way this could be accomplished by conventional injection molding equipment would be to heat the mold above the plastic melting point and then cool it after molding, but this would increase the period of the molding cycle and result in a commercially impractical long cycle.

In the present method the final sectional thickness is reached only as the mold or die becomes closed. Prior to that point the passages through which the plastic must flow are wider so that resistance to its flow is less. Moreover, freezing of the plastic in the mold is less serious since the central core of molten material has space to flow between the frozen skin adjacent to the mold surfaces. Employing the technique of this invention I have formed polyethylene containers having walls only 0.008" thick and polystyrene containers having walls only 0.010" thick.

The thin walls have the further advantage of permitting extremely rapid heat transfer into the mold walls, thus effecting rapid solidification or rigidification and thereby contributing to the shortening of the molding cycle. I have achieved a molding cycle of one and one-half seconds with my method as compared with the normal injection molding cycle of not less than ten seconds, or the compression molding cycle of thirty seconds or even longer.

The short cycle produced by this method, as well as the relatively light and simple molding machine that it requires, makes the molding unit especially well suited for incorporation in a filling machine. The separable mold collars 11', hereinbefore mentioned, may be used as handling devices to carry the formed containers through a filling unit where they may be filled with any desired content, and then to a sealing unit where a closure may be sealed on the filled container. The finished, filled, and sealed package may then be ejected from its carrier collar and the latter returned to the first station for repetition of the cycle.

Various modifications may be made in the practice of the process, and in the details of construction of the apparatus, herein described and illustrated without departing from the spirit and scope of the claimed invention.

What I claim is:

1. Apparatus for forming molded articles of thermoplastic material comprising upper and lower mold members, said members being movable relatively toward and away from each other, one of the members having a wall defining a cavity and the other member having a portion adapted to enter the cavity upon closing the mold members together, means for injecting molten thermoplastic material into the cavity of one of said mold members while the members are in open position, and a check valve forming a portion of said wall in the mold member having the cavity and through which the molten material is injected into the mold, said check valve being effective to facilitate the distribution of said thermoplastic material in said mold cavity prior to said closing of said mold members.

2. Apparatus for forming molded articles of thermoplastic material comprising an upper male mold member and a lower female mold member having a wall defining a shape-forming cavity, the upper member being movable vertically toward and away from the lower mold member, means for so moving said member, the male member having a portion that is adapted to enter the cavity of the female member upon moving the male member downward, means for injecting molten thermoplastic material into the cavity of the female member while the male member is raised substantially clear therefrom, a check valve forming a portion of the wall in the female mold member through which the molten material is injected into the cavity, said check valve being effective to facilitate the distribution of said thermoplastic material in said mold cavity prior to said closing of said mold members, the male member being pressed toward and into contact with the female member after injection of the molten material into the latter to cause the molten plastic material to assume the shape of the space between the inner wall of the mold cavity and the outer wall of the entering portion of the male mold member.

3. Apparatus for forming molded articles of thermoplastic material comprising upper and lower mold members, said members being movable relatively toward and away from each other, one of the members having a wall defining a cavity and the other member having a portion adapted to enter the cavity upon closing the mold members together, means for injecting molten thermoplastic material into said cavity while the members are in open position, a check valve forming a portion of said wall in the mold member having the cavity and through which the molten material is injected into the mold, said check valve operable to open when said mold members are in open position and to close and prevent the flow of molten thermoplastic material to and from said cavity when said mold members are in closed position, said check valve being effective to facilitate the distribution of said thermoplastic material in said mold cavity prior to said closing of said mold members, said mold member also having a detachable collar which supports the molded article and permits rapid removal of the finished article from the mold.

4. Apparatus for forming molded articles of thermoplastic material comprising upper and lower mold members, said members being movable relatively toward and away from each other, one of the members having a wall defining a cavity and the other member having a portion adapted to enter the cavity upon closing the mold members together, means for injecting molten thermoplastic material into said cavity while the members are in open position, a check valve forming a portion of said wall in the mold member having the cavity and through which the molten material is injected into the mold, said check valve being effective to facilitate the distribution of said thermoplastic material in said mold cavity prior to said closing of said mold members, said mold member having the cavity also having an annular cut-off to cut off any excess material which has been spread beyond the member having the cavity.

5. Apparatus for forming molded articles of thermoplastic material comprising upper and lower mold members, said members being movable relatively toward and away from each other, one of the members having a wall defining a cavity and the other member having a portion adapted to enter the cavity upon closing the mold members together, means for injecting molten thermoplastic material into said cavity while the members are in open position, a check valve forming a portion of said wall in the mold member having the cavity and through which the molten material is injected into the mold, said check valve being effective to facilitate the distribution of said thermoplastic material in said mold cavity prior to said closing of said mold members, said mold member having the cavity also having a detachable collar which supports the molded article and permits rapid removal of the finished article from the mold, said detachable collar having an annular cut-off to cut off any excess material which has been spread beyond the recessed member.

References Cited in the file of this patent

UNITED STATES PATENTS

| 1,706,874 | De Journo | Mar. 26, 1929 |
| 2,356,634 | Von Opel | Aug. 22, 1944 |
| 2,438,856 | Knowles | Mar. 30, 1948 |
| 2,463,401 | Lyons | Mar. 1, 1949 |
| 2,582,260 | Kutik | Jan. 15, 1952 |
| 2,648,098 | McElligott | Aug. 11, 1953 |

FOREIGN PATENTS

| 606,331 | Great Britain | Aug. 11, 1948 |